United States Patent [19]

Smith

[11] Patent Number: 4,687,179

[45] Date of Patent: Aug. 18, 1987

[54] AUTOMATIC VALVE ACTUATOR AND CONTROL SYSTEM

[76] Inventor: Gordon M. Smith, 1851 Chota Rd., La Habra Heights, Calif. 90631

[21] Appl. No.: 803,383

[22] Filed: Nov. 29, 1985

Related U.S. Application Data

[63] Continuation of Ser. No. 477,084, Mar. 21, 1983, abandoned.

[51] Int. Cl.$^4$ ............................................. F16K 31/42
[52] U.S. Cl. ...................................... 251/58; 251/56; 251/59; 74/424.8 VA; 91/361
[58] Field of Search ....................... 251/14, 58, 59, 30, 251/134, 309, 56; 137/884, 554; 91/391 R, 361, 1; 418/230; 74/424.8 VA

[56] References Cited

U.S. PATENT DOCUMENTS

| | | | |
|---|---|---|---|
| 1,230,150 | 6/1917 | Geraghty | 251/14 |
| 2,319,336 | 5/1943 | McCollough | 251/14 X |
| 2,340,999 | 2/1944 | Trott | 251/14 X |
| 2,352,140 | 6/1944 | Trott | 251/14 X |
| 2,698,157 | 12/1954 | Ludeman | 251/58 X |
| 2,743,897 | 5/1956 | Elliott et al. | 251/59 |
| 2,784,738 | 3/1957 | Thurber | 251/30 X |
| 3,141,647 | 7/1964 | Perazone | 251/58 X |
| 3,205,784 | 9/1965 | Ebersold | 91/1 |
| 3,411,409 | 11/1968 | Bunyard | 91/1 |
| 3,561,724 | 2/1971 | Trombetta | 251/134 X |
| 3,675,538 | 7/1972 | Keller et al. | 91/1 |
| 3,704,853 | 12/1972 | Whaler | 251/59 |
| 3,753,350 | 8/1973 | Nott | 91/361 |
| 3,819,147 | 6/1974 | Morrison | 251/14 |
| 3,822,612 | 7/1974 | Sanctuary | 251/134 X |
| 3,894,560 | 7/1975 | Baugh | 251/14 X |
| 3,911,955 | 10/1975 | Link | 251/30 X |
| 4,150,686 | 4/1979 | El Sherif et al. | 91/459 X |
| 4,320,812 | 3/1982 | Takaoka et al. | 91/458 |
| 4,380,325 | 4/1983 | Palmer | 251/14 |
| 4,383,546 | 5/1983 | Walters | 137/240 |
| 4,460,154 | 7/1984 | Kunkle | 251/14 X |

FOREIGN PATENT DOCUMENTS 941570  11/1963  United Kingdom ................. 251/14

OTHER PUBLICATIONS

*Electro-Hydraulic Valve Operator,* Keane Controls Corp.

*Primary Examiner*—Samuel Scott
*Assistant Examiner*—Allen J. Flanigan

[57] ABSTRACT

A valve actuator control system, although suitable for many control functions, is especially adapted for remote control of plug-type valves utilizes a unique configuration providing a unitary explosion-proof container to house all electrical components and also providing a manifold assembly that is adapted for either a hydraulic or pneumatic actuator motor with relatively minor modification. The manifold assembly is designed to accept all utilized control valves, relief valves, check valves, flow control devices, and manually operable override controls thereby simplifying installation and maintenance and reducing attendant costs. Three independent solenoid valves, responsive to mechanical feedback provided through the plug-valve's operating stem and integrated into the manifold within the explosion-proof container, provide for actuator motor control including a novel dual speed capability for enhancing plug-valve performance while precluding costly premature wear. A unique manual override safety feature comprising automatic motor power bypass within the manifold, assures personal safety despite unexpected reapplication of previously interrupted electrical and hydraulic or pneumatic power.

5 Claims, 20 Drawing Figures

AUTOMATIC VALVE ACTUATOR AND CONTROL SYSTEM

This is a continuation of application Ser. No. 477,084, filed Mar. 21, 1983, now abandoned.

BACKGROUND OF THE INVENTION

1. Field of the Invention

The present invention relates to the field of valves and more particularly, to remotely controllable automated actuators for plug-type valves.

2. Prior Art

Although the present invention may be suitable for use with a variety of valve types, it is especially adapted for use with the plug-type valve such as disclosed in U.S. Pat. Nos. 3,362,433 and 3,793,893 both issued to Heinen and both currently assigned to Aerojet-General Corporation the assignee of the present invention. The first such issued patent discloses a four-way diverter valve and the second such issued patent discloses a plug-type valve of the double block and bleed configuration which is either opened or closed for either passing or blocking the flow of fluid therethrough. Both such issued patents disclose the use of a handwheel operated actuator and the detailed structure of such an actuator is disclosed in the latter issued patent, the contents of which are incorporated herein by reference. As noted in that later issued patent, the drive shaft to which the handwheel is connected for actuating the valve may, if desired, be instead connected to a suitable power means such as a hydraulic or electric motor. The present invention pertains to such power means which render such valves suitable for automated actuation initiated from a remote location.

Such remotely controllable valve operators are especially useful in oil transferring and processing installations which are often located at great distances from any centers of population. They are also advantageous where such transferring or processing installations are widely dispersed in great numbers and it would be extremely slow, inconvenient and uneconomical to provide on-site manual control each time the status of a valve operator were to be changed such as by opening or closing a valve or by changing the direction of flow through a four way diverter valve.

Such valves are used predominantly in oil fields, petroleum processing plants and other processing industries where inflammable and explosive fluids are found. Therefore, the automatic actuators for such valves typically must have all electrical devices in explosion-proof configurations where any electrically generated spark can at worst produce a limited and contained explosion or fire. Explosion proofing is required to prevent a catastrophic explosion or fire in the environment of fumes where these valves are typically installed. Accordingly, explosion-proof electrical components or containment of non-explosion proof electrical components in explosion proof containers is virtually always an additional requirement that must be met by remotely controllable automatic actuators for such valves.

The most relevant known prior art relating to the present invention comprises an electro-hydraulic valve operator manufactured by Keane Controls Corporation of Fullerton, Calif. The Keane device utilizes a hydraulic motor and a single four-way three-position electrically operated solenoid valve which is exposed to the environment and must therefore be made independently explosion-proof at a substantially increased cost as compared to conventional solenoid valves. The remaining electrical components, consisting of cam-operated switches, are housed in an explosion-proof container. This container is mounted above the top of the valve for mechanical interaction with the valve's operator stem which extends above the valve and is attached to an indicator stem to provide a visual indication of the status of the valve. As a result of having two major separate explosion-proof components, this prior art actuator also requires an expensive copper electrical conduit.

Unfortunately, the Keane device suffers from a number of significant disadvantages which render it more costly to produce and to maintain than the present invention. Furthermore, the Keane apparatus provides a mechanical manual override which is available for manual operation of the valve upon failure of hydraulic and/or electrical power. However, this override feature is inherently unsafe to the manual operator in the event such power is restored while manual override operation is being effected. This significant safety disadvantage is overcome in the present invention as will be hereinafter more fully described. Furthermore, the Keane apparatus fails to provide any dual speed capability, thus requiring single speed valve operation either at an inconvenient and undesirable slow speed or at a undesirable high speed that may eventually result in permanent damage to the valve and/or the process pipeline.

SUMMARY OF THE INVENTION

The present invention provides an improved automatic valve actuator which overcomes all of the aforementioned disadvantages of the prior art. More specifically, in the present invention, all electrically operated components are housed within a unitary explosion-proof container. This feature alleviates the prior art requirement for separate components each independently explosion-proof and thereby significantly reduces the cost of the overall actuator. Furthermore, the present invention provides means for modularizing all electrical connections within the explosion-proof container to facilitate a significant reduction in manufacturing costs and field site assembly and also to facilitate significantly simpler field site replacement of all malfunctioning electrically operated parts.

The present invention also provides a clearly advantageous unitary hydraulic manifold to which all exterior connections are readily made. This manifold includes a built-in high pressure filter. As a result, this unique manifold substantially reduces the costs of the system as compared to prior art devices including the Keane device which utilizes a separate high pressure filter assembly of far greater cost. In addition, this unique manifold is designed to receive all of the utilized directional control valves, relief valves, manual override mechanisms, check valves, and flow control devices, thereby significantly reducing the complexity of the overall system for ease of manufacture and maintenance.

The unique manifold feature of the present invention is also particularly advantageous because it is used either in an electro-hydraulic actuator as shown below or in an electropneumatic actuator with relatively minor modification. In addition, the present invention provides three independent solenoid valves responsive to the mechanical feedback provided through the operating stem of the plug valve. One of these valves is designated for executing operation of the valve operating mechanism in one direction such as for closing the valve. Another of these solenoid valves is designated for executing opposite operation such as for opening a valve and a third of these solenoid valves may be used to provide for the aforementioned two-speed hydraulic motor operation whereby the plug valve may be operated either faster or more safely than plug valves utilizing the prior art automatic actuators. The switch controlling this third solenoid valve may be used for sequence control of a second valve whereby two valves may be operated in an appropriate sequence for such purposes as product mixing or product selection when requiring operation in precise unison as required using prior art actuators. Furthermore, the switch operating the third solenoid valve may be used alternatively for simple indication purposes such as for providing a means for identifying the intermediate position status of the valve. This is a potentionally useful function where either electrical or hydraulic power has failed and it is important for remotely located controller personnel to be aware of the intermediate position of the valve such as between fully closed and fully opened configurations.

The present invention also provides a unique safety override mechanism which enables operation of the valve during either electrical or hydraulic power failures or both. Although such mechanical override capability is provided in the prior art Keane device, the present invention provides a unique, manually operated, hydraulic line short circuit capability which prevents inadvertent powered actuation of the hydraulic motor during manual operation thereby obviating the risk of personnel injury which is present in the prior art device.

OBJECTS OF THE INVENTION

It is therefore a principal object of the present invention to provide an improved automatic valve actuator and control system primarily adapted for use with plug-type valves and which overcomes or substantially reduces the noted disadvantages of the prior art.

It is an additional object of the present invention to provide an improved automatic valve actuator and control system having a unitized and modularized indication and control system in which all electrical components are contained within a single explosion-proof container.

It is still an additional object of the present invention to provide an improved automatic valve actuator having a unitary hydraulic manifold with a built-in filter assembly.

It is still an additional object of the present invention to provide an improved automatic valve actuator adapted for use with plug-type valves and including provision for effecting two-speed operation of the valve operating mechanism.

It is still an additional object of the present invention to provide an improved automatic valve actuator adapted for use with plug-type valves and capable of sequencing a second valve in unison operation. It is still an additional object of the present invention to provide an improved automatic valve actuator adapted for use with plug-type valves and having means for indicating at a remote location that the valve operating mechanism is in an intermediate position.

It is still an additional object of the present invention to provide an improved automatic valve actuator that is normally adapted for operation with both hydraulic and electric power but which provides a manual override capability for valve actuation without either such source of power available but which will not endanger operating personnel despite inadvertent re-application of electric or hydraulic power.

It is still an additional object of the present invention to provide an improved automatic valve actuator that is primarily adapted for use with plug-type valves and which is less costly to produce and easier to maintain than automatic valve actuators of the prior art.

It is still an additional object of the present invention to provide an improved automatic valve actuator which is readily adapted for use in either an electro-hydraulic or an electro-pneumatic mode with a minimum of modification and component substitution.

It is still an additional object of the present invention to provide an improved automatic valve actuator and control system which is submersible.

It is still an additional object of the present invention to provide an improved automatic valve actuator and control system which utilizes check valves to provide hydraulic braking and locking.

BRIEF DESCRIPTION OF THE DRAWINGS

The aforementioned objects and advantages of the present invention, as well as additional objects and advantages thereof will be more fully understood hereinafter as a result of the detailed description of a preferred embodiment of the invention when considered with the accompanying drawings in which.

DETAILED DESCRIPTION OF A PREFERRED EMBODIMENT

Figure 1:
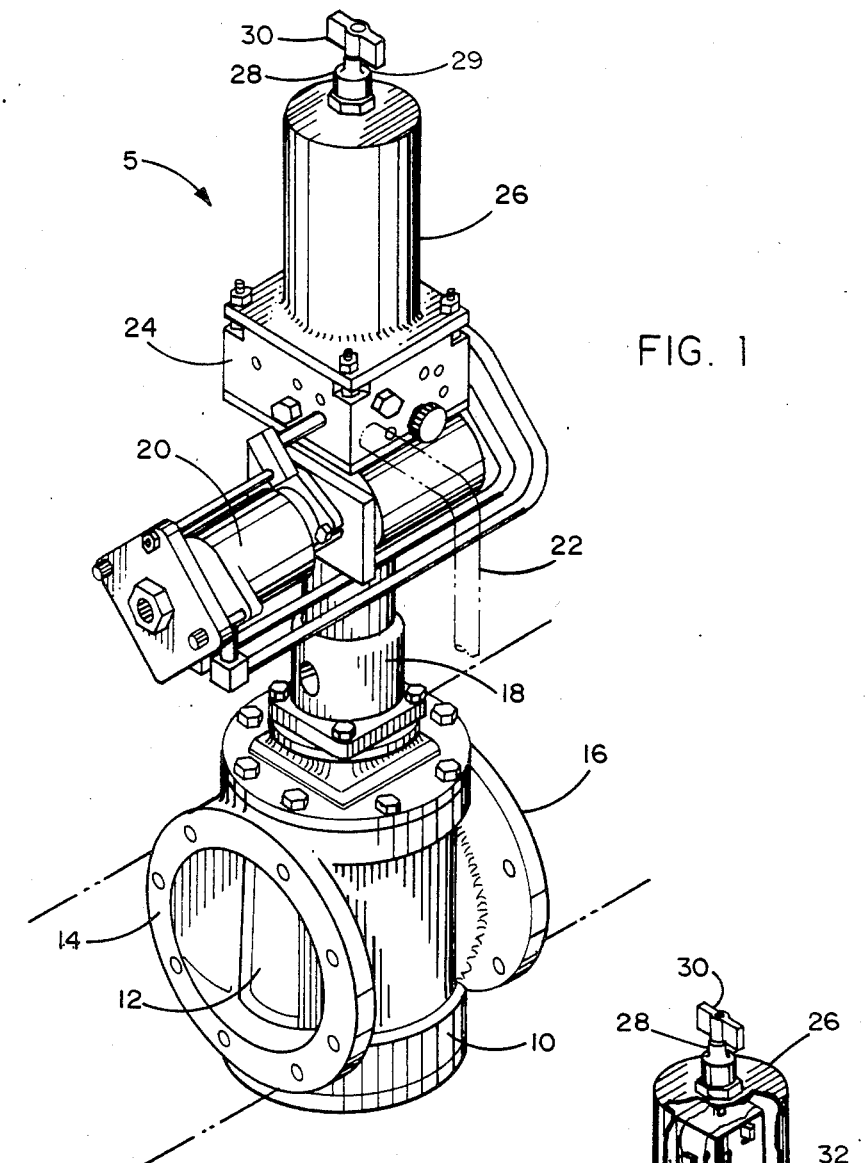
FIG. 1 is an isometric illustration of an exemplary valve/actuator assembly including the present invention.

Referring now to FIG. 1 there is shown an exemplary installation of the present invention comprising an automatic valve actuator 5 installed on a double block and bleed plug-type valve 10 for the purpose of opening and closing of valve 10. It will be understood that the valve per se does not form a part of the present invention but is disclosed herein for the purpose of fully describing the manner in which the present invention operates on such valves. Valve 10 comprises at least one sealing slip 12 forming part of an interior plug (not shown) for the purpose of either permitting flow or blocking flow between an inlet 14 and an outlet 16. The position of sealing slip 12 for either opening or closing the valve 10 is determined by the actuator of the present invention in conjunction with a gear housing 18. The structure and operation of plug 10 and gear housing 18 are fully described in issued U.S. Pat. No. 3,793,893 and therefore need not be described herein in further detail.

Figure 5:
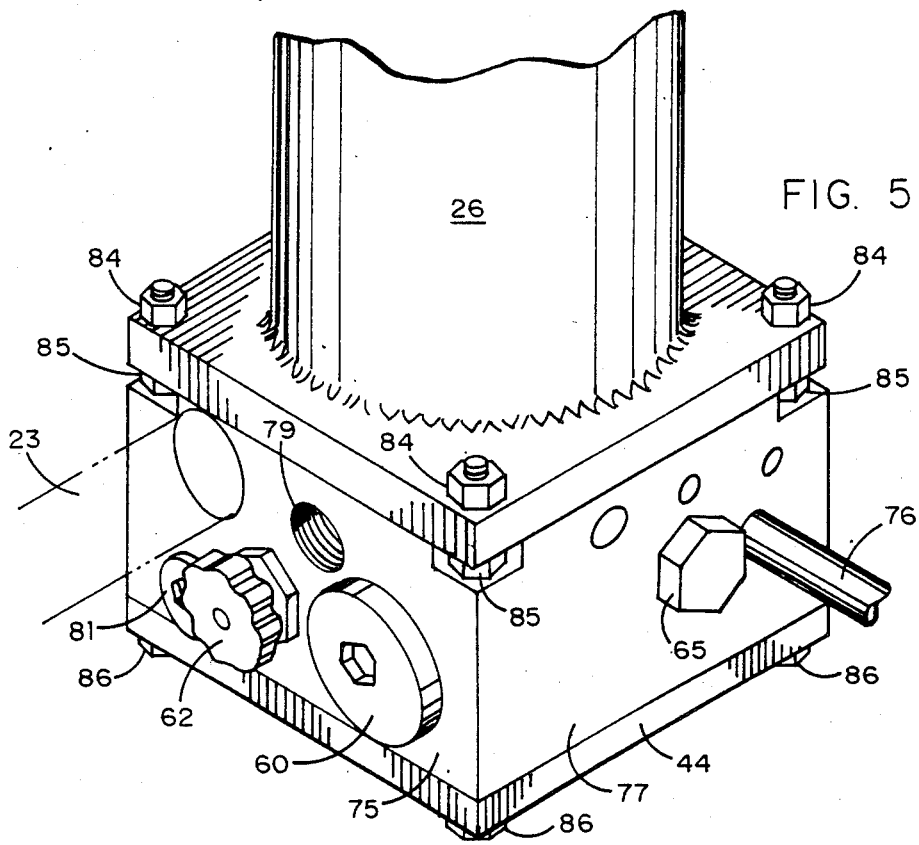

As seen in FIG. 1, the present invention comprises a hydraulic motor 20, a hydraulic manifold 24 and an explosion-proof container 26. Hydraulic motor 20 is oriented so that its shaft 21 (see FIG. 3) is properly interfaced within gear housing 18 as disclosed in the aforementioned patent. The hydraulic fluid pressure necessary to enable hydraulic motor 20 for rotation of its shaft 21 with proper torque in either direction for either opening or closing the valve is provided by a hydraulic pressure supply pipe 22 with a corresponding hydraulic return pipe 23 seen best in FIG. 5. It is seen in FIGS. 1 and 5 that the hydraulic pressure supply pipe 22 and hydraulic return pipe 23 are connected directly to the hydraulic manifold 24. The function of manifold 24 and its components is control of the direction, flow rate and pressure of hydraulic fluid to hydraulic motor 20 for controlling the rate and direction of rotation and torque of the motor, thus, control of the opening and closing operations of the valve 10. It will also be seen that the hydraulic manifold 24 and explosion-proof container 26 are, in the particular embodiment disclosed herein, mounted on top of valve 10 whereby to provide an overall compact structure for the present invention and to permit convenient mechanical interaction with valve 10 by means of a mechanical feedback arrangement provide by a valve operator stem 28. Operator stem 28 is linked indirectly to the plug of valve 10 thereby providing a mechanical indication of the vertical and rotational position of the valve plug. Stem 28 thereby provides the components of the present invention with a direct feedback indication of the opened, closed and intermediate status of valve 10. As seen further in FIG. 1, valve operator stem 28 terminates in an indicator flag 30 which also provides a visual indication of the status of the valve 10 in a well-known manner. A rubber boot 29 on stem 28 aids in preventing rain and other elements from entering container 26.

Figure 2:
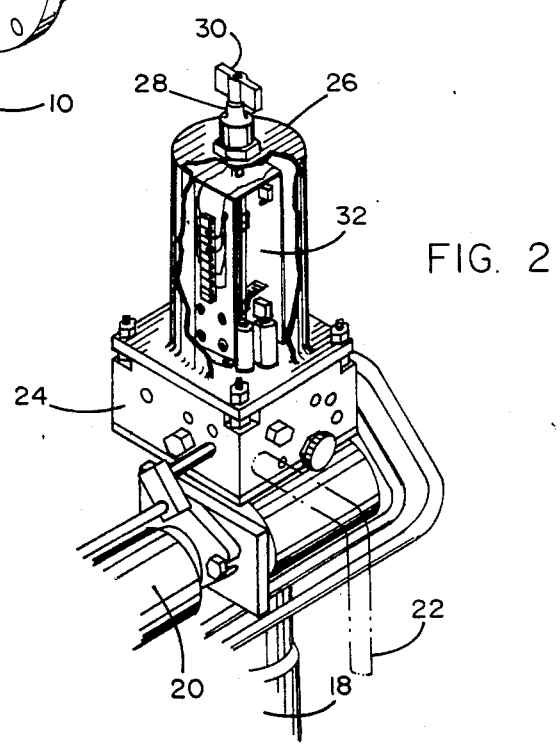
FIG. 2 is an isometric view of the actuator of the present invention with the explosion-proof container thereof partially broken away.

In the present invention there are no exposed electrical components which would otherwise require independent explosion-proof packaging in order to meet the explosion-proof specification previously described. The present invention avoids this problem of the closest prior art by housing all electrical components advantageously within unitary explosion-proof container 26. This feature of the invention is shown in part in FIG. 2 in which the explosion-proof container 26 is partially broken away to reveal the electrical components contained therein including a number of solenoid operated hydraulic valves as well as switches and attendant wiring which are conveniently and advantageously mounted to a unique switch bracket 32 the purpose and configuration of which will be more fully understood hereinafter.

Figure 3:
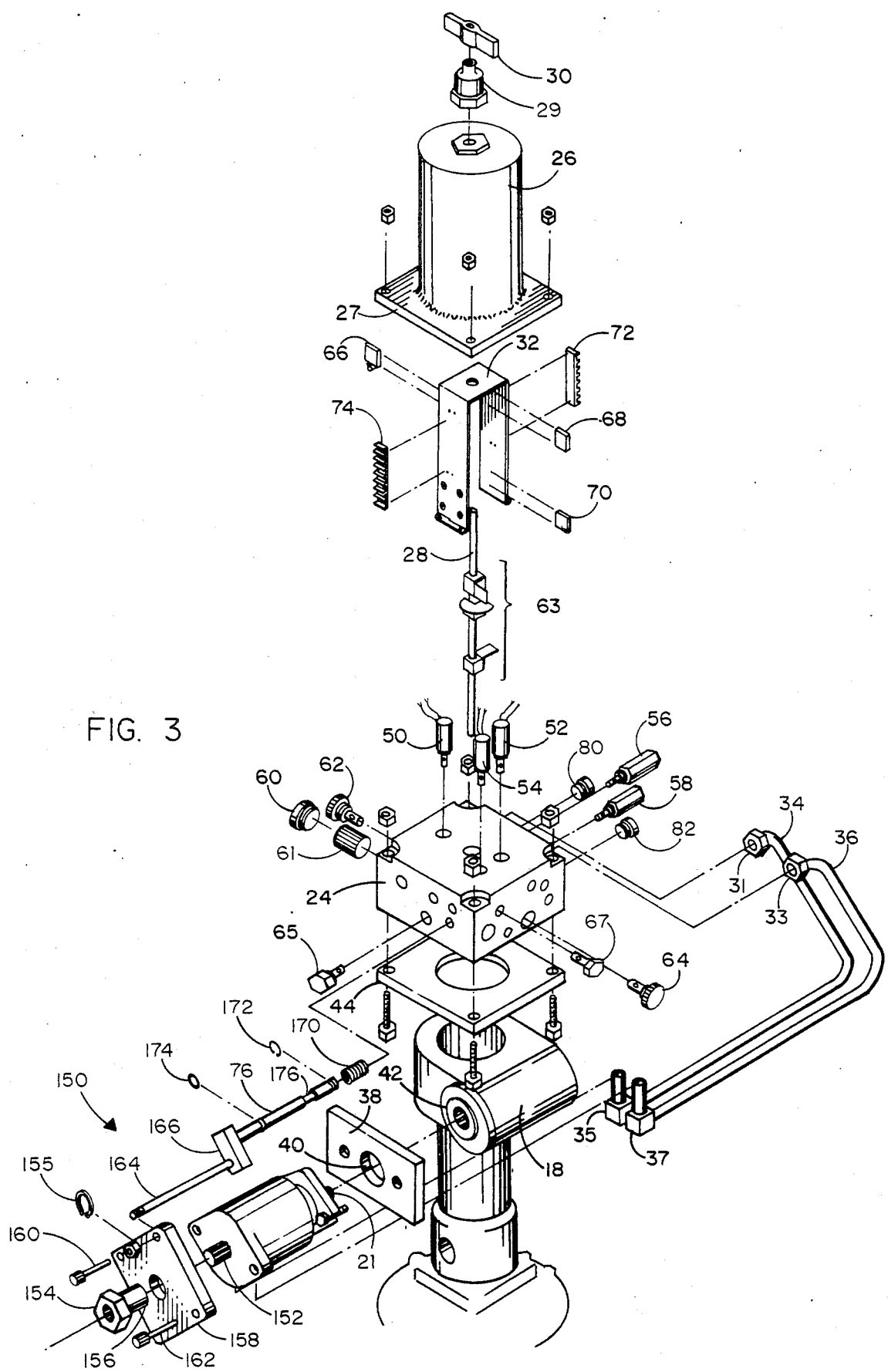
FIG. 3 is an exploded view of the assembly of the present invention.

Reference will now be made to FIG. 3 to provide a more detailed description of the components and relative configuration of the present invention. More specifically, as seen in FIG. 3 explosion-proof container 26 is a generally cylindrical-shaped container having a rectangular base 27 that is adapted to be secured to the top surface of hydraulic manifold 24 which is of substantially congruent rectangular dimensions as observed from the top. As also seen in FIG. 3, switch bracket 32 receives three switches 66, 68 and 70 as well as a pair of terminal blocks 72 and 74 all of which are mounted directly to the switch bracket forming a switch module.

Further it will be seen that three solenoid operated hydraulic valves 50, 52 and 54 are mounted to the top surface of hydraulic manifold 24 immediately adjacent switch bracket 32 which is also mounted to the top surface of the manifold. It will be seen hereinafter that switches 66, 68 and 70 effect the status of solenoid operated hydraulic valves 50, 52 and 54 and are in turn operated by the switch paddle and block assembly 63 which is mechanically mounted to the valve operator stem 28 within switch bracket 32. Details of the operation and interface between the components of switch paddle and block assembly 63 and switches 66, 68 and 70 are discussed more fully hereinafter in conjunction with FIGS. 6 through 11.

As seen further in FIG. 3, a pair of adapter brackets are utilized to provide appropriate mounting interface between manifold 24 and gear housing 18 as well as between hydraulic motor 20 and gear housing 18. These two brackets are manifold-gear housing adapter bracket 44 and motor-gear housing adapter bracket 40, respectively. These brackets perform the function of adapting the given mounting hole configuration of gear housing 18 to the hydraulic manifold and hydraulic motor mounting configurations, respectively.

In addition to receiving all of the electrical components of the present invention, manifold 24 also receives all of the hydraulic components of the invention in addition to the solenoid operated hydraulic valves 50, 52 and 54. More specifically, it will be seen that a pair of motor hydraulic supply pipes 34 and 36 are connected at their first ends to a side of manifold 24 by means of connectors 31 and 33 and are connected at their second ends to hydraulic motor 20 by means of connectors 35 and 37. In addition, hydraulic manifold 24 receives a pair of pilot operated relief valves 56 and 58 which alternately function as pilot valves and pressure limiters depending upon the direction of hydraulic fluid flow through supply pipes 34 and 36. Hydraulic manifold also receives a filter cap 60 and a disposable filter element 61. Unlike the closest prior art wherein the filter assembly is a separate component, in the present invention, the filter is received directly by the manifold 24 thereby substantially decreasing the cost and time involved in a replacing the filter element during periodic maintenance of the actuator.

Hydraulic manifold 24 also receives a pair of hydraulic manual override controls 62 and 64 which may be used to manually apply appropriate hydraulic flow for closing and opening the valve, respectively. In addition the manifold 24 receives a pair of flow control valves 65 and 67, respectively, which, it will be seen hereinafter, are connected in parallel to permit selection of one of a plurality of flow rates and thus motor shaft rotation rates for actuating valve 10. Thus for example, by utilizing flow control valves 65 and 67 in the appropriate sequence, one might choose to operate the valve mechanism during a portion of its sequence at one rate and then at another rate during the remainder of its sequence. This is precisely what is done in the preferred embodiment wherein flow control valve 65 is rated at 6 GPM and flow control valve 67 is rated at 4 GPM.

During the closing of valve 10 where the slip 12 is first moved with the plug in a rotary motion, only flow control valve 67 is open so that this portion of the opening sequence of the valve 10 is performed at a relatively slow rate. However, the vertical motion of the plug of valve 10 is performed at a high rate with both flow control valves 65 and 67 functioning. As a result, the overall elapsed time for opening the valve is significantly reduced as compared to what it would be if the valve were closed at the relatively low rate corresponding to the rate of rotating the slip. However, because the actual transition between passage of flow and blockage of flow through valve 10 is performed at a relatively slow rate, there is a significant reduction in the inimical effects on the valve 10 that would otherwise be incurred if the valve were opened at a unitary high rate of speed.

Figure 4:
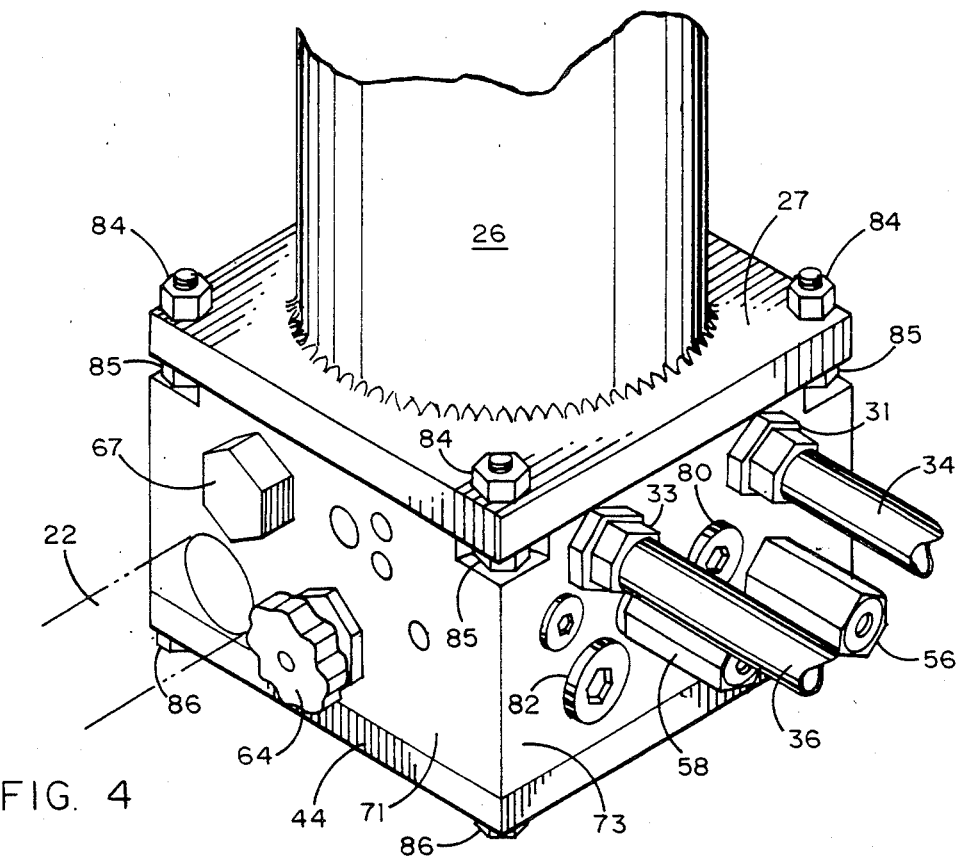
FIGS. 4 and 5 provide enlarged views of the hydraulic manifold of the invention.

Reference will now be made to FIGS. 4 and 5 for a more detailed description of the various component interconnections that are made directly to the hydraulic manifold 24. More specifically, as seen in FIGS. 4 and 5, the top and bottom faces of manifold 24 receive a rectangular plate 27 of explosion-proof container 26 and the manifold-gear housing adapter bracket 44, respectively. As previously indicated, all electrical components are received by manifold 24 along its top surface but within the cylindrical, confined region of explosion-proof container 26. This portion of the connections to manifold 24 wll be discussed hereinafter in conjunction with FIGS. 6 and 7.

All of the hydraulic interconnections to hydraulic manifold 24 are, as seen in FIGS. 4 and 5, effected along the side wall of the manifold which are identified by reference numerals 71, 73, 75 and 77 in FIGS. 4 and 5. As seen in FIG. 4, side wall 71 of manifold 24 receives the hydraulic pressure supply 22 as well as one of the two hydraulic manual override controls, 64 and one of the two flow control valves, 67.

Similarly, side 73 of manifold 24 receives the two motor hydraulic pipes 34 and 36 which are used to transfer hydraulic fluid in the appropriate direction to the hydraulic motor 20 as previously described. These two supply pipes are connected to the manifold by a pair of connectors 31 and 33, respectively. Side 73 of the manifold also receives the two pilot-operated valves 56 and 58, one of which provides pilot valve capability and the other of which provides pressure limiter capability for one direction of fluid flow into motor 20. It will be understood that the functional roles of valves 56 and 58 are reversed upon application of fluid flow in the opposite direction. Side 73 of manifold 24 also receives a pair of check valves 80 and 82. Check valves 80 and 82 provide hydraulic braking and locking by effectively locking the hydraulic motor or equivalent cylinder.

Referring now to FIG. 5 it will be seen that side 75 of manifold 24 receives filter cap 60, second hydraulic manual override control 62, hydraulic return line 23, a metered outlet plug 81 for use with hydraulic cylinders and an electrical mating inlet 79 for receiving solenoid power and control signals and for transmitting indicator signals for reporting on the status of the valve configuration to a remote location. FIG. 5 also shows that side 77 of manifold 24 receives flow control 65 as well as a manual override bypass rod 76. It will be seen hereinafter that bypass rod 76 provides a means for bypassing the hydraulic fluid pressure otherwise applied to the hydraulic motor 20 during operation of manual override which permits safe opening and closing of the valve manually.

As also shown in FIGS. 4 and 5, manifold 24 is mechanically connected to manifold-gear housing adapter bracket 44 and also to explosion-proof container 26 by a plurality of studs 86 which extend upwardly from the lower side of bracket 44 through the manifold and through the base 27 of the explosion-proof container. Studs 86 are secured to the manifold by a plurality of nuts 85 and a second plurality of nuts 84 secures the base 27 to the same studs.

Figure 7:
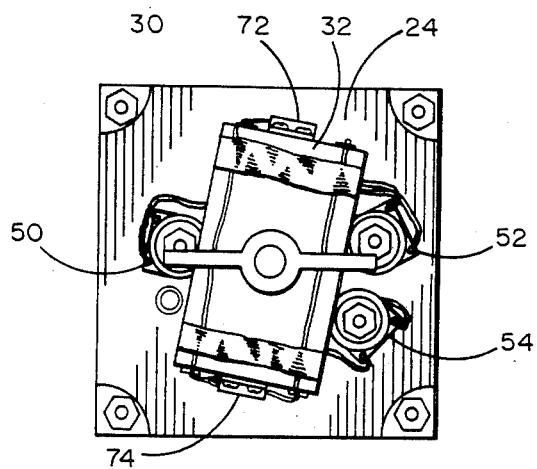
FIGS. 6 and 7 provide enlarged views of the electrical portion of the invention.
Figure 6:
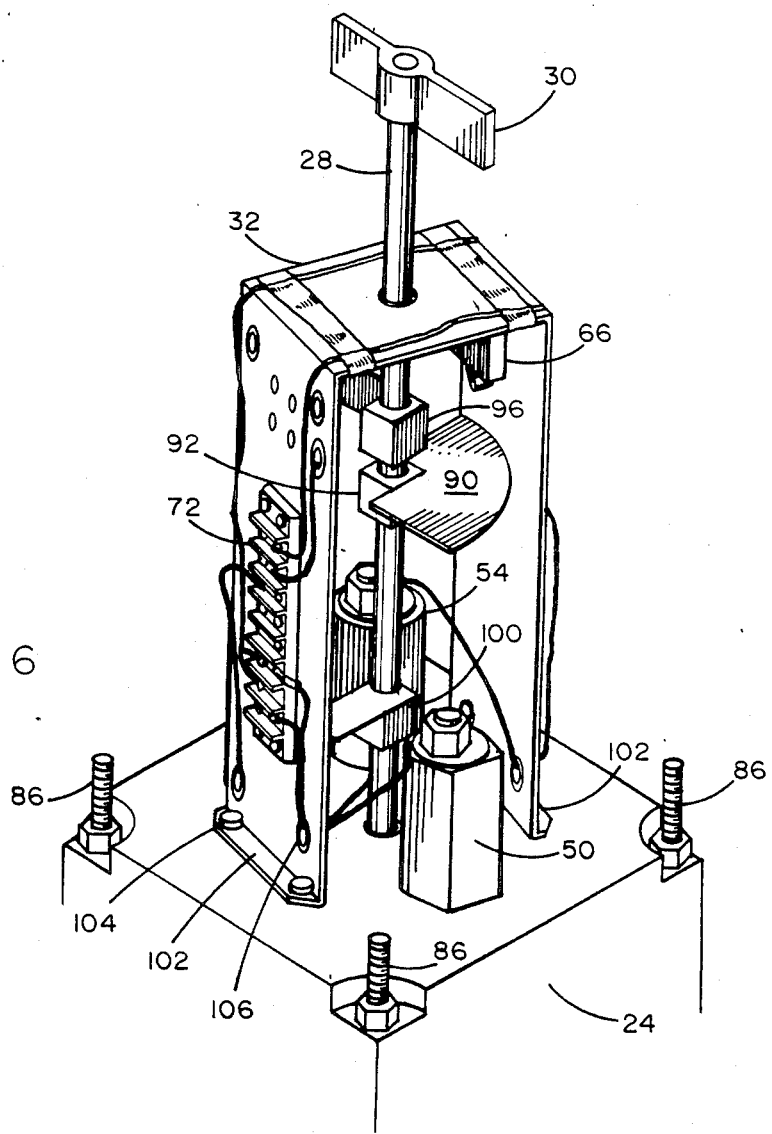
Figure 8:
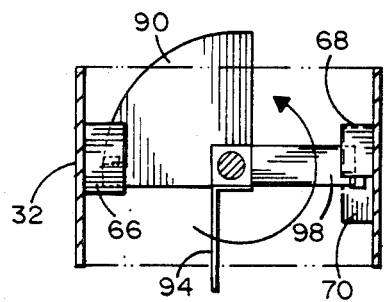
FIGS. 8 through 11 illustrate views of the mechanical-electrical interface structure of the present invention.
Figure 9:
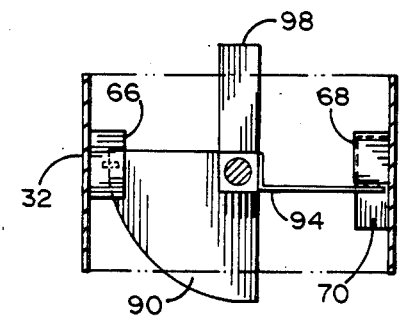
Figure 10:
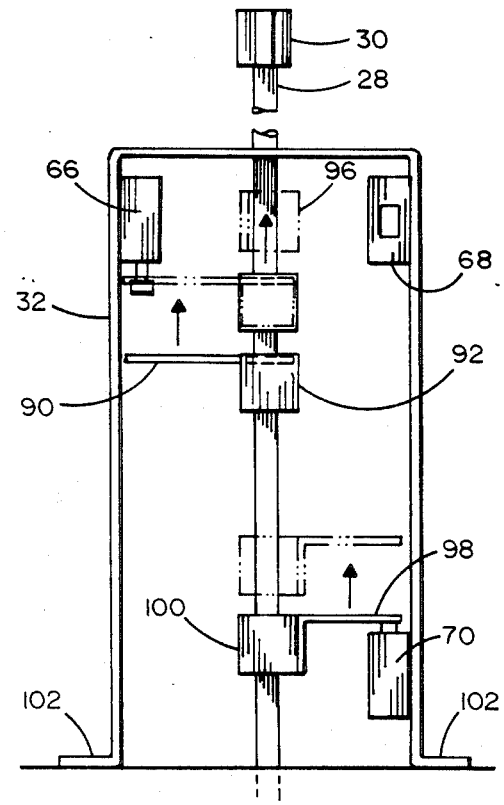
Figure 11:
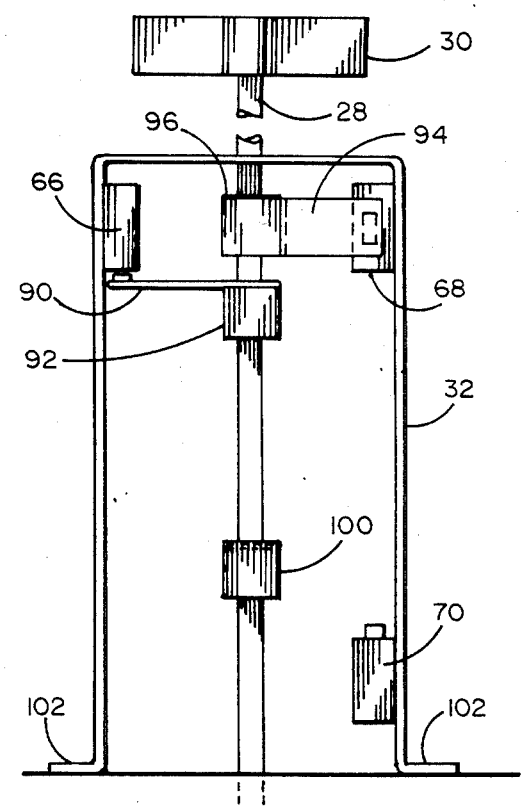
Figure 12:
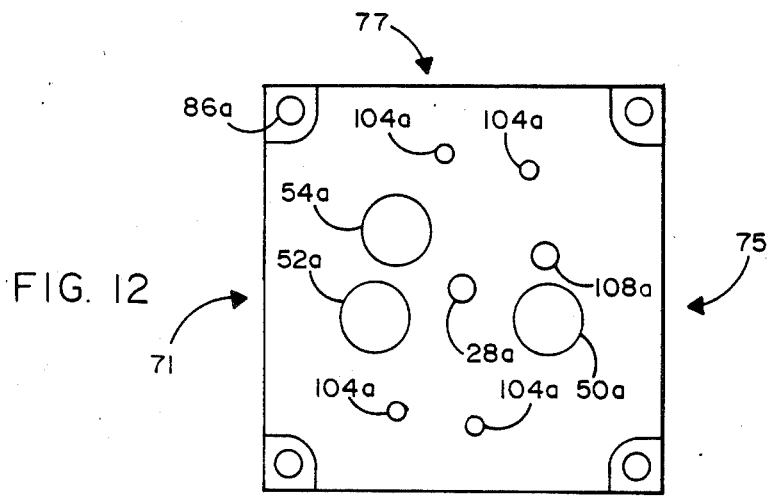
FIGS. 12 through 17 provide illustrations of all surfaces of the manifold of the present invention.
Figure 13:
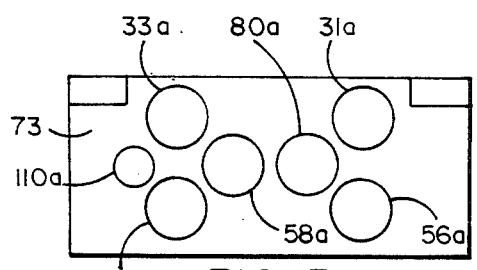
Figure 14:
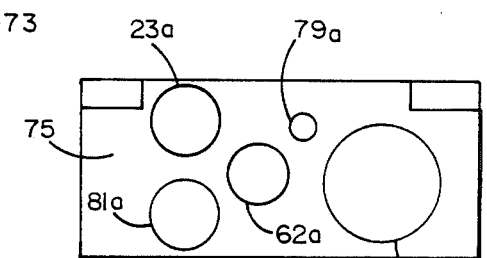
Figure 15:
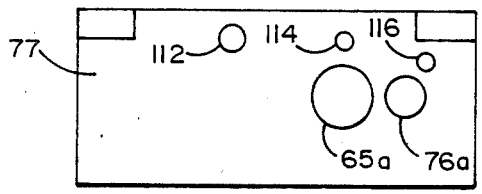
Figure 16:
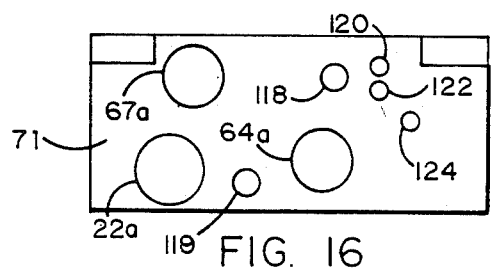
Figure 17:
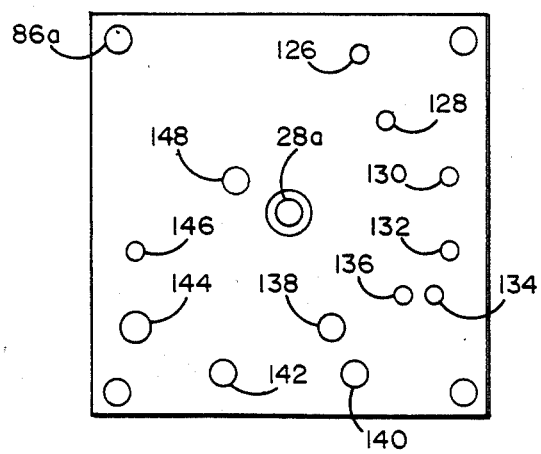

Reference will now be made to FIGS. 6 and 7 for a more detailed description of the components normally contained within explosion-proof container 26. As seen in FIGS. 6 and 7, the principal components of the present invention contained within explosion-proof container 26 comprise the three solenoid operated valves 50, 52 and 54, three switches 66, 68 and 70 and a corresponding switch paddle and block assembly 63. As seen best in FIGS. 8-11, switch paddle and block assembly 63 comprises switch paddles 90, 94 and 98 and paddle blocks 92, 96 and 100. The paddle blocks and switch paddles provide a means for mechanical interaction between stem 28 of valve 10 and the switches. The switches control the status of the solenoid operated hydraulic valves and thus, actuation of hydraulic motor 20. As seen in FIG. 6 the switches are mounted on the inside surfaces of switch bracket 32. Bracket 32 is also adapted to receive a pair of terminal blocks 72 and 74 which provide a convenient means for safely terminating and interconnecting the electrical wiring for the switches and solenoid operated hydraulic valves of the invention. Switch bracket 32 is provided with a plurality of grommet holes 106 to provide a convenient means of feeding wiring from terminal blocks 72 and 74 to the switches and solenoid valves. As seen further in FIG. 6, switch bracket 32 is provided with a pair of flanges 102 to enable convenient mechanical connection of the switch bracket 32 to the hydraulic manifold 24 by a plurality of flange bolts 104. All incoming and outgoing electrical wiring is routed through inlet 79 on side 75 of manifold 24 to aperture 108a on the top surface of the manifold.

Solenoid operated hydraulic valve 50 is the valve which permits hydraulic fluid flow to be applied to the close port of hydraulic motor 20 to close valve 10. Similarly, solenoid operated hydraulic valve 52 is the valve which permits hydraulic fluid flow to be applied to the open port of hydraulic motor 20 to open valve 10. Furthermore, in the configuration herein disclosed, the present invention provides a third solenoid operated hydraulic valve 54 which, as will be seen hereinafter, provides means for stepping the input hydraulic flow rate between two different values one of which is appropriate for high speed operation of the valve plug and one of which is appropriate for lower speed operation of the valve plug.

As previously indicated, the third switch 66 may be used for purposes other than controlling dual speed control of valve 10 by means of valve 54, namely, such purposes as control of non-synchronous operation of a second valve. In addition, switch 66, which normally controls the operation of solenoid valve 54, may be used for additional intermediate indicating purposes either alone or in conjunction with a solenoid operated valve. Such indication purposes for example, might include an indication of the approximate status of the valve plug between its fully opened and fully closed configurations. In any case, in the configuration of the preferred embodiment illustrated herein, the three solenoid operated hydraulic valves 50, 52 and 54 provide for applying hydraulic fluid pressure for either opening or closing the valve plug and doing so at either one of two operating rates depending upon the status of solenoid operated hydraulic valve 54. The status of these solenoid operated valves is determined by switches 66, 68 and 70 along with the incoming command signal. The actuated and unactuated conditions of switches 66, 68 and 70 are, in turn, dictated by the mechanical interaction between the operator stem 28 of the valve 10 and the plurality of switch paddles and paddle blocks comprising switch paddle and block assembly 63. This interaction may be better understood by reference to FIGS. 8 through 11 which shall now be discussed.

It will be understood that valves with which the present invention is designed to operate, namely, plug-type valves, include a plug which moves in a combined sequence of rotational and axial directions in order to effect opening or closing of the valve. It will also be understood that operator stem 28 is mechanically linked indirectly to the plug so that the stem 28 also moves rotationally and axially in precisely the same way as the plug. Accordingly, operator stem 28 provides a form of mechanical feedback indicating the precise status of the plug. It is therefore the function of switch paddle and block assembly 63 and switches 66, 68 and 70 to provide a means of transforming the mechanical feedback of stem operator 28 to an electrical format which in turn influences the operation of solenoid operated hydraulic valves 50, 52 and 54.

This mechanical-to-electrical transformation is accomplished by securing paddle blocks 92, 96 and 100 to operator stem 28 as shown in FIGS. 8 through 11. Each such paddle block has associated with it a corresponding switch paddle 90, 94 and 98, respectively each such switch paddle is geometrically oriented relative to a switch 66, 68 and 70, respectively to activate such a switch at the appropriate time in the sequence of valve opening and closing to control the operation of the associated solenoid valves. Thus, it will be seen that switch bracket 32 is positioned relative to operator stem 28 so that switch paddle 90 can contact switch 66. Paddle 90 is affixed to paddle block 92 which is in turn mounted to the operator stem 28. The 90 degree segment shape of paddle 90 enables it to contact and close switch 66 for the entire portion of the plug operating cycle during which the plug is in its maximum unseated position and operator stem 28 is at its most elevated point in the cycle. It is to be noted that paddle 90 is shaped as a 90 degree segment in order to effect switch closure during the entire 90 degree rotational portion of plug operation.

Similarly, it will be observed that switch paddle 94, which is of rectangular shape, is affixed to paddle block 96. Paddle block 96 is in turn secured to operator stem 28 at an uppermost portion of the operator stem within switch bracket 32. Its location permits actuation of switch 68 when the plug and therefore the operator stem, have completed rotational motion placing the plug in the fully opened valve configuration. Similarly, switch paddle 98 is affixed to a paddle block 100 at a lower-most portion of operator stem 28 to effect actuation of switch 70 when the plug has been lowered into its fully seated position corresponding to a closed configuration of valve 10.

Thus, it will be seen that switch 70 is actuated when valve 10 is closed, that switch 68 is actuated when valve 10 is fully opened and that switch 66 is actuated whenever the plug is being actuated in its rotational motion configuration. It will also be observed that switch paddle and block assembly 63 of the present invention utilizes a plurality of relatively flexible lever-type paddle elements forming switch paddles 90, 94 and 98. As a result, the need for precise accuracy in placing the switch paddles relative to the switches on operator stem 28 is significantly reduced as compared to the prior art. The prior art utilizes a single cam-type actuator which must be precisely positioned to effect closure of switches on both the fully opened and fully closed positions of valve 10.

Reference will now be made to FIGS. 12 through 17 for a more detailed description of the hydraulic manifold 24 of the present invention. In the preferred embodiment of the invention described herein, manifold 24 is manufactured by drilling cavities of appropriate shape and location in a 7 inch×7 inch×3 inch rectangular block of 6061-T6 aluminum. However, it will be understood that other dimensions and materials may be suitable particularly for example, in a manifold more specifically adapted for control of a pneumatic motor or for remote position indication of manually operated valves.

In order to simplify the explanation of the manifold configuration, the cavities in the 6 faces of the manifold provided in FIGS. 12 through 17 are identified by either a subscripted number or an unsubscripted number. The subscripted numbers correspond to cavities adapted to receive a component previously described in conjunction with FIGS. 1 through 7. Thus for example, in FIG. 14 the cavity 60a is adapted to receive filter cap 60 and element 61 previously described. On the other hand, those cavities having numerals without a subscript are apertures which are adapted to be plugged and are utilized only in the manufacture of the manifold but do not receive a functioning component. The cavities illustrated in FIGS. 12 through 17 provide an indication of the position of each aperture relative to the dimensions of the manifold and are indicative of the maximum diameter of each aperture corresponding to spot face dimensions. However a more detailed description of the manifold aperatures including a description of the cavity geometry intersecting holes and function are provided in Table I herein which combined with FIGS. 12 through 17 provides a description of the manifold 24 sufficient to enable one skilled in the art to make and use the manifold in conjunction with the invention without requiring further inventive skill.

Figure 18:
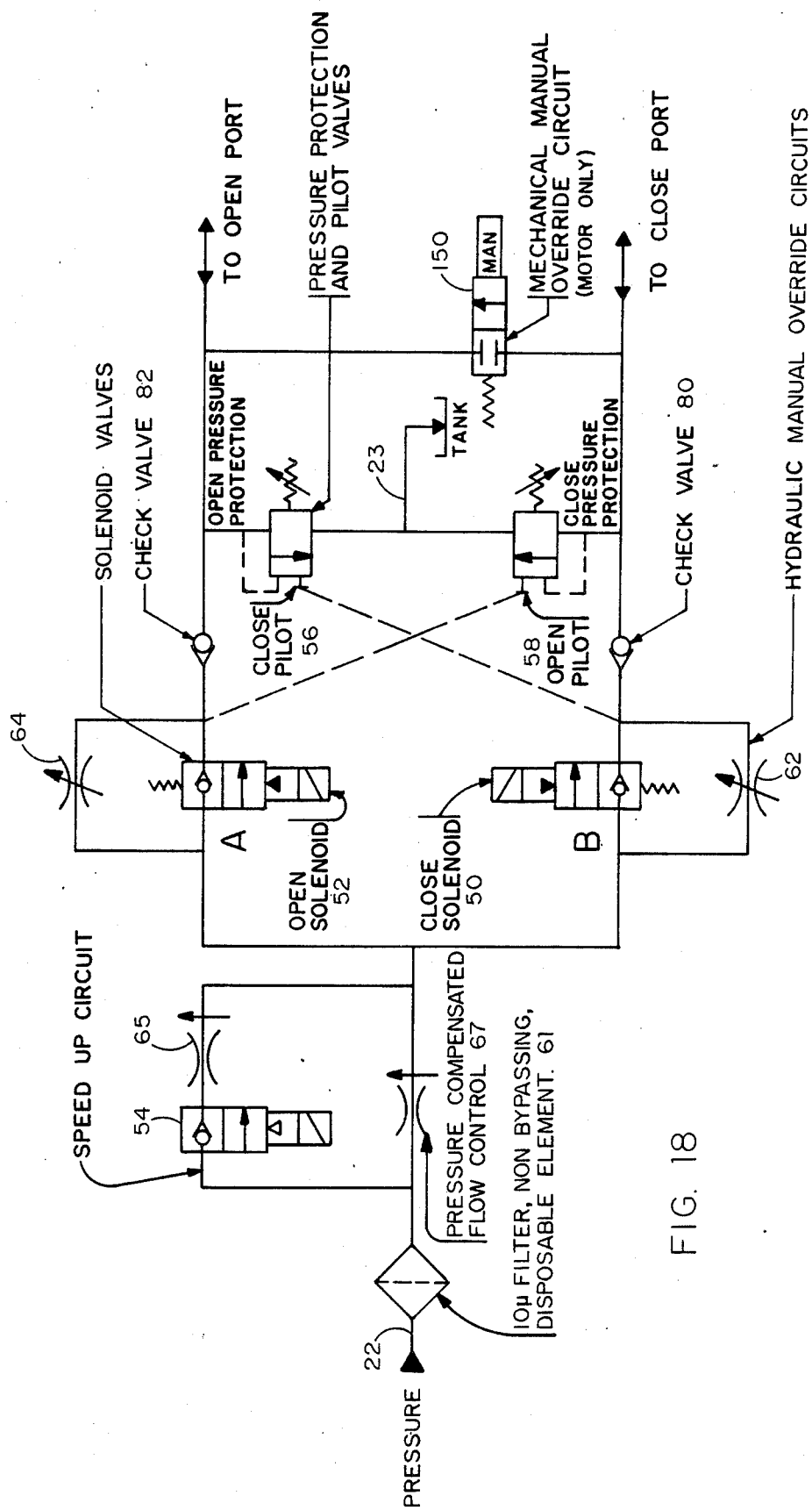
FIG. 18 is a simplified hydraulic schematic of the present invention.

Reference will now be made to FIG. 18 for a general description of the overall hydraulic operation of the present invention. As seen in FIG. 18, hydraulic pressure is applied through hydraulic pressure supply 22 with hydraulic flow passing through a 10 micron non-bypassing disposable filter element 61. Hydraulic pressure is then applied to flow control valves 65 and 67 which are connected in parallel. Flow control valve 65 having solenoid operated hydraulic valve 54 connected in series therewith to provide a means of controlling the flow rate into the remaining portion of the hydraulic circuit of the invention. In the preferred embodiment of the invention disclosed herein, the flow rate of flow control valve 67 is 4 GPM and the flow rate of flow control valve 65 is 6 GPM. Accordingly, with solenoid operated hydraulic valve 54 in its closed or nonactuated configuration, total flow rate into the remainder of the hydraulic system of the invention is limited to 4 GPM. However, when solenoid valve 54 is actuated permitting flow through flow control valve 65, the combined flow rate into the remainder of the hydraulic system of the invention then totals 10 GPM. Accordingly, it will be understood that the ratio of high speed to low speed operation in the present invention is 2.5 to 1. However, it will be understood that other flow control valves can be selected to provide virtually any ratio desired for high speed operation relative to low speed operation.

with hydraulic manual override 62 and in series with check valve 82 which is in turn connected to the close

TABLE I

| Manifold Hole | Cavity Description | Intersecting Holes | Function |
|---|---|---|---|
| 50a | 9/16 by 1.59 Deep | 118, 62a | Solenoid Valve |
| 52a | 9/16 by 2.37 Deep | 118, 64a, 82a | Solenoid Valve |
| 54a | 9/16 by 2.56 Deep | 114, 119 | Solenoid Valve |
| 28a | .377 Thru | None | Stem |
| 104a | .25 by .625 Deep | None | Module |
| 108a | 13/32 by 2.62 Deep, | 79a | Electrical |
| 86a | 13/32 Thru | None | Bolt |
| 31a | 37/64 by 2.16 Deep | 142, 120 | Close Port |
| 33a | ¼ by 2.15 Deep | 140, 122 | Open Port |
| 56a | ⅝ by 2.875 Deep, Counter Drill .812 × .968 Deep | 142, 75a, 64a | Torque Limiter |
| 58a | ⅝ by 2.875 Deep, Counter Drill .812 × .968 Deep | 140, 138, 62a | Torque Limiter |
| 80a | 9/16 by 3.00 Deep | 142, 62a | Check Valve |
| 82a | 9/16 by 3.00 Deep | 140, 64a | Check Valve |
| 110a | 33/64 by 1.831 Deep | 124, 136, 134, 76a | Manual Override Spring |
| 23a | .806 by .971 Deep | 144 | Hydraulic Return |
| 60a | 13/32 by 5.281 Deep, Counter Drill 1.794 by 4.081 Deep | 22a, 65a, 128 | Filter |
| 62a | ¼ by 4.50 Deep, Counter Drill 13/32 by 3.00 Deep | 146, 50a, 80a, 58a | Close Override |
| 81a | 13/32 by 4.30 Deep | 144, 56a, 138 | Meter Out |
| 79a | 13/32 by .62 Deep | 108a | Electrical |
| 65a | 9/16 by 1.71 Deep | 60a, 126 | Flow Control |
| 76a | 33/64 by 1.02 Deep, Counter Drill .750 × .270 Deep | 134, 136, 124, 110 | Bypass |
| 112 | 13/32 by 4.30 Deep, Counter Drill .4724 × .512 Deep | 108, 118 | Plugged |
| 114 | ¼ by 2.20 Deep, Counter Drill .2756 × .295 Deep | 126, 54a | Plugged |
| 116 | ¼ by 3.00 Deep, Counter Drill .2756 × .295 Deep | 67a, 130 | Plugged |
| 22a | 13/32 by 4.00 Deep | 60a | Hydraulic Supply |
| 64a | ¼ by 5.50 Deep | 132, 82a, 52a, 56a | Open Override |
| 67a | 13/32 by 1.79 Deep | 116, 128 | Flow Control |
| 118 | 13/32 by 6.37 Deep, Counter Drill .4724 × .512 Deep | 132, 52a, 50a, 146 | Plugged |
| 119 | 13/32 by 4.37 Deep, Counter Drill .4724 × .512 Deep | 130, 54a, 108 | Plugged |
| 120 | ¼ by 5.37 Deep, Counter Drill .2756 × .295 Deep | 136, 31a | Plugged |
| 122 | ¼ by 2.00 Deep, Counter Drill .2756 × .295 Deep | 33a | Plugged |
| 124 | ¼ by 2.75 Deep, Counter Drill .2756 × .295 Deep | 110, 138 | Plugged |
| 126 | ¼ by 2.50 Deep, Counter Drill .2756 × .295 Deep | 65a, 114 | Plugged |
| 128 | ¼ by 2.50 Deep, Counter Drill .2756 × .295 Deep | 60a, 67a | Plugged |
| 130 | ¼ by 2.40 Deep, Counter Drill .2756 × .295 Deep | 119, 116 | Plugged |
| 132 | ¼ by 2.30 Deep, Counter Drill .2756 × .295 Deep | 64a, 118 | Plugged |
| 134 | ¼ by 2.05 Deep, Counter Drill .2756 × .295 Deep | 122 | Plugged |
| 136 | ¼ by 2.65 Deep, Counter Drill .2756 × .295 Deep | 120 | Plugged |
| 138 | 13/32 by 1.40 Deep, Counter Drill .4724 × .512 Deep | 75a, 58a | Plugged |
| 140 | 13/32 by 2.62 Deep, Counter Drill .4724 × .512 Deep | 82a, 58a, 33a | Plugged |
| 142 | 13/32 by 2.62 Deep, Counter Drill .4724 × .512 Deep | 56a, 80a, 31a | Plugged |
| 144 | 13/32 by 2.30 Deep, Counter Drill .4724 × .512 Deep | 75a, 23a | Plugged |
| 146 | ¼ by 2.30 Deep, Counter Drill .2756 × .295 Deep | 62a, 118 | Plugged |
| 148 | 13/32 by 2.62 Deep, Counter Drill .4724 × .512 Deep | 112, 119 | Plugged |

The combined output of flow control valves 65 and 67 is then applied to parallel open and close hydraulic circuits for controlling the direction of rotation of hydraulic motor 20 and therefore effecting open and close operation of valve 10. The close circuit comprises solenoid operated valve 50 which is connected in parallel port 31a of hydraulic motor 20 by means of hydraulic supply pipe 34 as discussed previously. When the present invention is utilized to operate valve 10 for closing action the closing hydraulic circuit is completed by means of fluid return through hydraulic supply pipe 36, manifold port 33a and pilot operated relief valve 58 which routes the hydraulic fluid back to tank via hydraulic return 23. It will be understood of course that during close operation, the solenoid operated hydraulic valve 52 is in its hydraulic blocking mode, assuring hydraulic flow in only the close loop portion of the hydraulic circuit. It will also be understood that during close operation, pilot operated relief valve 56 acts as a pressure limiter by providing close hydraulic fluid pressure protection with excess pressure being returned to tank.

Similarly, when the hydraulic circuit of the present invention is used to open valve 10, solenoid operated hydraulic valve 52 is actuated to pass hydraulic fluid while solenoid valve 50 is in its fluid blocking mode. Solenoid valve 52 is connected in parallel with hydraulic manual override valve 64 and in series with check valve 80 which is in turn connected to manifold port 33a and motor hydraulic supply pipe 36. In this mode, return is effected through supply pipe 34 and pilot operated relief valve 56 through hydraulic return 23 to tank. In this mode of operation pilot operated relief valve 58 provides pressure limiting protection with excess pressure being returned to tank. As shown further in FIG. 18 the hydraulic circuit of the present invention is provided with a manual bypass 150 which is connected between the open and close ports of manifold 24. As will be discussed hereinafter, this spring return manual bypass hydraulic override circuit provides an important and highly advantageous personnel safety feature which is unique to the present invention and which provides a means for preventing inadvertent hydraulic motor operation while hydraulic motor 20 is being operated manually to open or close valve 10 in the manner to be described hereinafter.

As seen best in the exploded view of the invention provided in FIG. 3, manual bypass 150 comprises a wrench nut 154 which has an integral splined cylindrical portion 156. This splined portion is designed to slide concentrically over splined shaft 152 of hydraulic motor 20 whereby the respective splines are engaged. Engagement of the splines enables rotation of shaft 152 and thus shaft 21 of motor 20 by means of a wrench manually applied to the wrench nut 154.

As will be seen hereinafter, wrench nut 154 is ordinarily disengaged from splined shaft 152 of motor 20 whereby wrench nut 154 remains stationary during automatic operation of hydraulic motor 20 as described above. However, when it is desired or necessary to provide a means for manually rotating shaft 21 of motor 20 to either open or close valve 10, wrench nut 154, and thus its integral spline portion 156, may be spring-compressed towards motor 20. Ultimately the splines of portion 156 and of shaft 152 engage to permit manual override of the operation of hydraulic motor 20. However, as it will be seen below, in order to accomplish this manual override configuration, the user is, in effect, forced to bypass hydraulic pressure otherwise applied to hydraulic motor 20. Thus, in the event of inadvertent reapplication of previously interrupted hydraulic or electrical power, the user cannot be injured by the resultant rapid high torque rotation of the shaft of hydraulic motor 20, wrench nut 154 and the manual wrench applied to the wrench nut by the user.

This automatic bypass arrangement comprises an override bracket 158 which is slideably secured to hydraulic motor 20 by a pair of bracket bolts 160 and 162. Also secured to the override bracket 158 at its uppermost corner is a pushrod 164 which is connected to an adapter block 166. Adapter block 166 provides an offset connection to bypass rod 76 which is received in a corresponding cavity 76a in manifold 24. Bypass rod 76 is provided with a compression clip 172 which is in a compressive axial relationship with a spring 170 also contained within cavity 76a in manifold 24. An O-ring 174 is configured within a suitable slot on bypass rod 76 to provide a leakage-free connection into hydraulic manifold 24.

During conventional automated operation of the present invention, spring 170 presses against compression clip 172 which, in turn, forces bypass rod 76 toward hydraulic motor 20 thereby preventing hydraulic bypass within manifold 24 and also disengaging wrench nut 154 and shaft 152. However, when it is desired to utilize the motor override function of bypass 150, the user pushes override bracket 158 towards hydraulic motor 20. Because of retaining clip 155, wrench nut 154 and particularly the spline portion 156, engages the spline shaft 152 of motor 20. At the same time, bracket 158 pushes pushrod 164 towards manifold 24 thereby also pushing adapter block 166 and bypass rod 76 towards the manifold. As a result, spring 170 is compressed, allowing a reduced diameter portion 176 of bypass rod 76 to be positioned within the manifold 24 in the hydraulic path between hydraulic ports 31 and 33.

The override system 150 is designed so that override bracket 158 must be pushed at least ⅜ inch before spline portion 156 and spline shaft 152 begin engaging. On the other hand, bypass rod 76 need be pushed only ⅛ inch into manifold 24 before the reduced diameter portion 176 begins to provide hydraulic pressure bypass between ports 31 and 33. As a result, it is impossible to provide the necessary mechanical interaction for manual override of hydraulic motor 20 without also bypassing hydraulic pressure to motor 20. Thus, in the event of a power failure of either the electrical or hydraulic pressure source requiring manual override for opening or closing valve 10, and inadvertent reapplication of either source of power while manual override is being effected, hydraulic pressure to motor 20 cannot be applied because of hydraulic bypass 150. Injury to the user, which might otherwise result from inadvertent activation of motor 20, is thereby precluded. Thus, unlike the closest prior art previously described, the manual override bypass circuit of the present invention provides a means for manually overriding hydraulic motor 20 while precluding inadvertent serious injury to the user.

Figure 19:
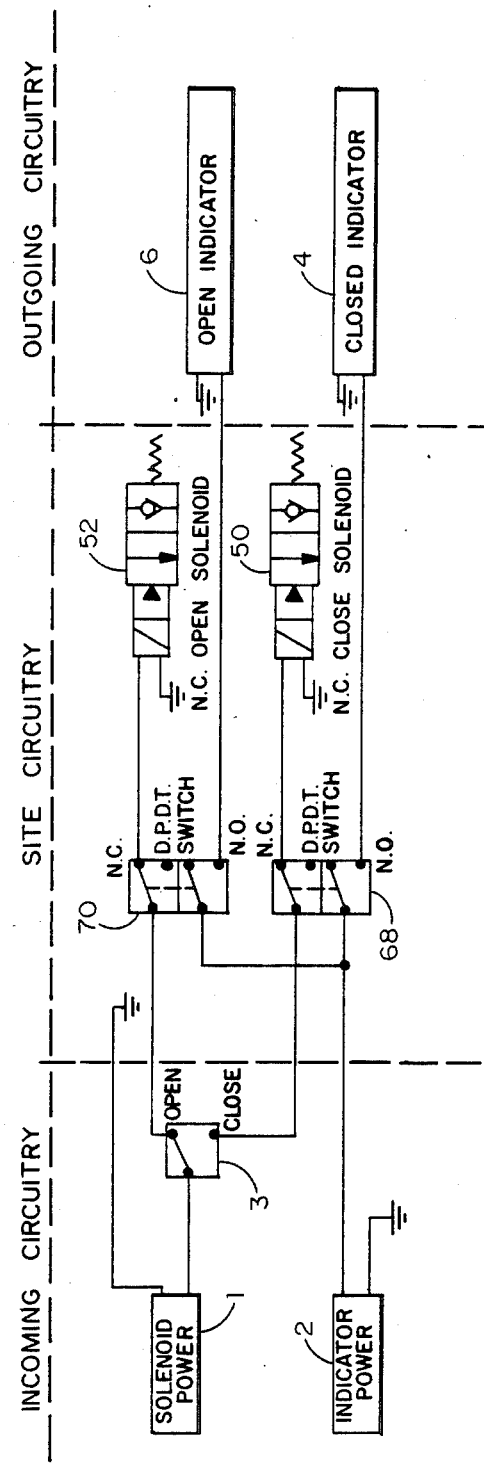
FIG. 19 is a simplified electrical schematic of a first embodiment of the present invention.
Figure 20:
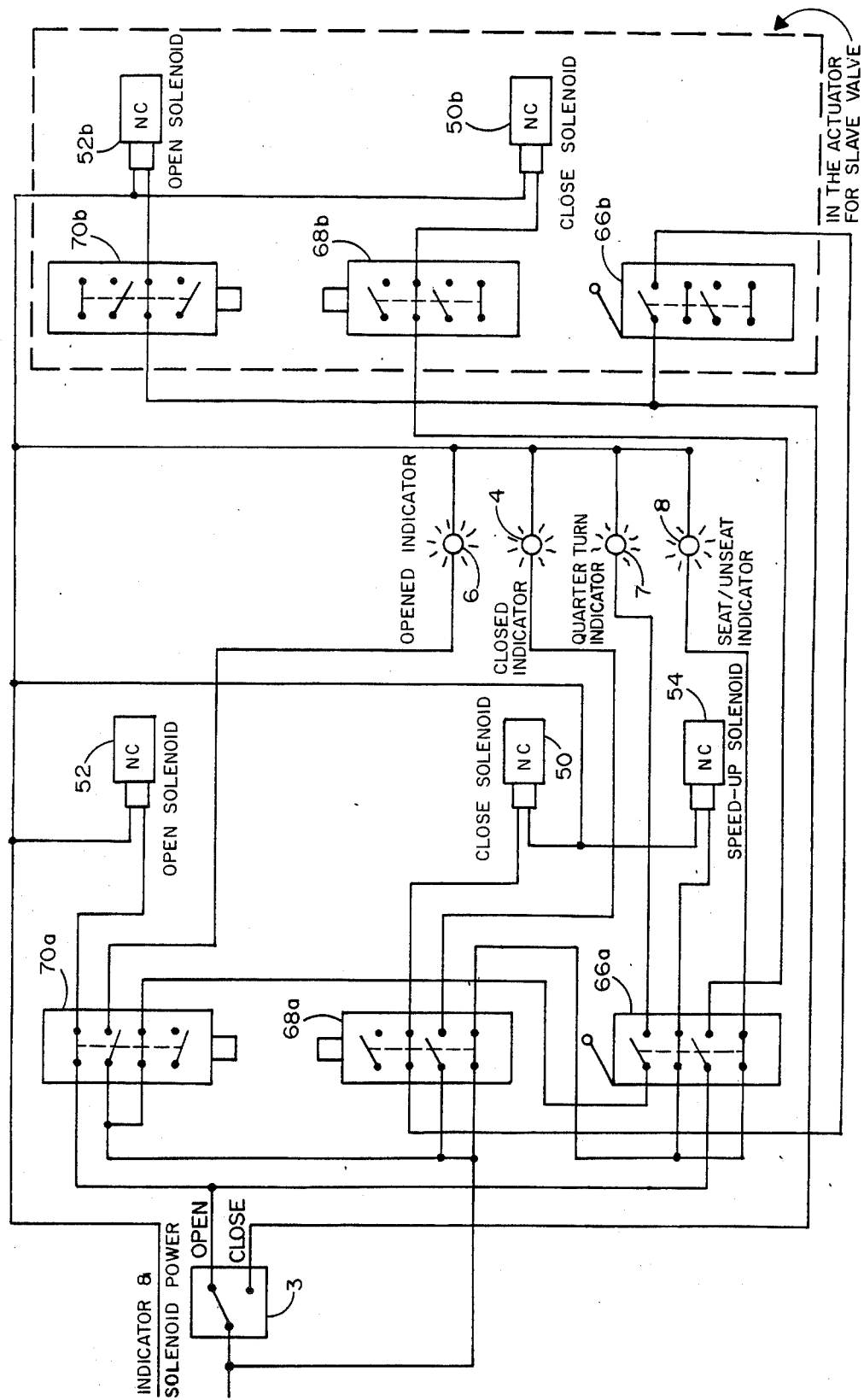
FIG. 20 is a simplified electrical schematic of a second embodiment of the present invention.

Reference will now be made to FIGS. 19 and 20 for a description of the electrical portion of the invention. It will be noted that FIGS. 19 and 20 provide alternative representations of the electrical portion of the invention. FIG. 19 represents the minimum electrical apparatus to operate the present invention for the simple function of opening and closing valve 10. On the other hand, FIG. 20 represents a more sophisticated electrical configuration which, in addition to providing opening and closing of valve 10, also provides for dual speed operation of the valve, for control of a slaved second valve and for a more exotic form of valve status indicating. In addition to showing the open and closed status of the valve as provided in the circuit of FIG. 19, the circuit of FIG. 20 also provide means for identifying the intermediate status of the valve wherein the plug of valve 10 is in its vertical transition for either seating or unseating the plug or in its quarter turn transition for reorienting the plug for either blocking or permitting flow through the valve before the plug has been seated.

It will be noted in FIG. 19 that the electrical portion of the present invention is shown divided into three distinct components comprising incoming circuitry, site circuitry and outgoing circuitry. It is assumed that under normal operating conditions and installations of the present invention, the incoming circuitry portion and outgoing circuitry portion would both be installed at a remote site relative to the location of the invention where control and observation of the result may be carried out. As seen in FIG. 19, a solenoid power source 1 is connected to a single pole, double throw open/close switch 3. Switch 3 provides means for applying solenoid power for either opening or closing valve 10. The open terminal of switch 3 is connected to one pole of open switch 70 and the closed terminal of switch 3 is connected to one pole of closed switch 68. The other poles of switches 68 and 70, respectively, are both connected to an indicator power source 2. As seen further in FIG. 19, one of the output terminals on the solenoid side of switch 70 is connected to open solenoid-operated hydraulic valve 52 and another of the output terminals on the indicator side of switch 70 is connected to a remotely located open indicator 6. Similar connections are made for switch 68 wherein one terminal is connected to solenoid-operated hydraulic valve 50 and one terminal is connected to a remotely located closed indicator 4.

Switches 68 and 70 are both shown in their normally closed configuration wherein paddle block assembly 63 has not yet affected either switch. Accordingly, when switch 3 is thrown, for example, to the open position as seen in FIG. 19, solenoid valve 52 is actuated thereby effecting operation of hydraulic motor 20 for opening valve 10. When the valve has reached its fully opened configuration, switch 70 is actuated by paddle block assembly 63 as previously described, thereby removing power from solenoid 52 and applying indicator power to the open indicator 6 reporting on the open status of the valve. When valve 10 is to be closed, switch 3 is thrown to the closed position as seen in FIG. 19 and the same sequence of events takes place in closing the valve 10 by means of solenoid 50 and switch 68 eventually resulting in a closed indication being reported to the remote site by means of closed indicator 4.

In the electrical configuration of FIG. 20 double-pole, double-throw switches 68 and 70 of FIG. 19 are replaced by four-post interactive single-pole, double-throw switches 68a and 70a, respectively. In addition, the circuit of FIG. 20 also includes the third switch 66a which is also a four-post interactive single-pole, double-throw configuration switch. In the circuit of FIG. 20 the same open and closed solenoids 52 and 50 are used, however, the third solenoid 54 is also utilized as part of the speed-up circuit previously described in conjunction with the hydraulic schematic of FIG. 18. In the circuit of FIG. 20 switches 68a and 70a each have the same two output connections described previously in conjunction with FIG. 19. However, in addition, each provides a third output which is connected to speed-up switch 66a.

Speed-up switch 66a has four output connections. One of these four output connections is applied to speed-up solenoid 54 which is activated to increase the rotational velocity of hydraulic motor 20 during substantially all of the vertical movement of the plug of valve 10. In this regard it will be seen that speed-up solenoid 54 is actuated as long as close switch 68a is unactuated and until switch 66a is acted upon by paddle and block assembly 63. Switch 66a also provides two intermediate position indicator outputs, one connected to a ¼ turn indicator 7 and one connected to a seat/unseat indicator 8. Seat/unseat indicator 8 receives power under the same conditions that speed-up solenoid 54 receives power, namely, whenever the close switch 68a is unactuated and the speed-up switch 66a is not actuated by paddle and block assembly 63. On the other hand, ¼ turn indicator 7 is activated only when open switch 70a remains unactuated and speed-up switch 66a has been actuated by the paddle and block assembly 63. Accordingly, the two indicators 7 and 8 provide indications of the intermediate status of the valve 10 wherein the plug is being moved in either its vertical portion or ¼ turn portion during either opening or closing of valve 10.

As seen further in FIG. 20, the present invention provides means for controlling a second or slave valve by means of three additional switches 66b, 68b and 70b. The latter two switches control additional solenoid operated hydraulic valves 50b and 52b, respectively. It will be understood that although a slave valve may be connected to the master valve for operation in a number of different sequences, in the configuration illustrated in FIG. 20, the slave valve is connected electrically to the actuater of the present invention to provide opposite valve configuration control. In other words, when the master valve is opened, the slave valve is closed and vice versa.

It will be seen that when solenoid control switch 3 is set to the close position, solenoid power is applied to the open switch of the slave valve actuator to actuate open solenoid 52b. Furthermore, it will be seen that electrical power to close switch 68a of the master valve actuator is not applied to the switch until switch 66b of the slave valve actuator has been effected by its corresponding paddle and block assembly. As a result, closing of the master valve is not effected until the opening operation of the slave valve has progressed to the point where that valve plug is experiencing its ¼ turn operation. Similarly, it will be observed that the closed switch 68b of the slave valve actuator receives its power from the speed-up switch 66a through a terminal which is connected to the open terminal of control switch 3. As a result, when the master valve actuator is to be opened, and accordingly, the slave valve actuator is to be closed, the latter does not occur until after the master valve plug is in its ¼ turn operation of the opening sequence. As a result, at no time in the master slave sequence are both the slave and master valves closed to flow. This is a common requirement in master/slave valve configurations where it may be desired to change the flow configuration using two valves without interrupting flow.

Table II provides an exemplary indication of the manufacturer and model number of those major components of the preferred embodiment of the invention described above and which are readily available from a number of sources:

TABLE II

| Reference Numeral | Part Name | Source | Part Number | Comment |
| --- | --- | --- | --- | --- |
| 67 | Flow Regulator | Modular Control | FR1-10-F-0-4.0 | 4 GPM Set |
| 65 | Flow Regulator | Modular Control | FR1-10-F-0-6.0 | 6 GPM Set |
| 50, 52, 54 | Solenoid Valves | Modular Control | SV1-10-C-0-110AL | 110 VAC NC. |
| 62, 64 | Needle Valves | Modular Control | NV1-10-K-0 | KNOB |
| 80, 82 | Check Valves | Modular Control | CV1-10-P-0-15 | 15 PSID CRACK |
| 56, 58 | Relief Valves | Modular Control | RV3-10-I-0-18 | 250–1800 PSI |
|  | Piston Assembly | Modular Control | Pilot Pistons | For RV3-10 |
| 61 | Filter Element | Facet | C-1318 | 10 Micron |
| 66, 68, 70 | Switches | Licon | 22-104 |  |
| 20 | Motor | Nichols | 106-1-AT1 |  |

It will now be understood that what has been disclosed herein comprises an improved automatic valve actuator that is especially adapted for remote control of plug-type valves. A number of novel features have been disclosed including a novel configuration providing a unitary explosion-proof container to house all electrical components, as well as a unique manifold assembly which is designed to accept all utilized control valves, relief valves, check valves, flow control devices and manually operable overriding controls thereby simplifying installation, maintenance and reducing costs associated with such actuators. Three independent solenoid operated valves and associated electric switches are provided rendering the actuator responsive to mechanical feedback provided through the plug valve operating stem. These independent solenoid valves are integrated into the manifold within the explosion-proof container to provide for actuator motor control for either opening and closing the valve in the case of a double block and bleed valve, or diverting flow in the case of a four-way diverter valve. A novel dual speed capability is provided for enhancing plug valve performance while precluding costly premature wear. In addition, a unique manual override safety feature is provided which comprises automatic motor power bypass within the aforementioned manifold. This bypass feature assures personnel safety despite unexpected reapplication of previously interrupted electrical and/or hydraulic or pneumatic power. One example of the cost saving aspect of the present invention includes the provision within the aforementioned novel manifold of the invention of a means for providing a built-in filter in the form of a disposable element which may be replaced conveniently and inexpensively during routine maintenance. The invention also provides for remote indication of valve status including a novel interim position status indication capability in one disclosed embodiment.

It will be understood that although a preferred embodiment of the invention utilizing the combination of hydraulic and electrical power has been described, as a result of the teaching herein disclosed, those having skill in the art to which the present invention pertains will now perceive a variety of alternative configurations for carrying out the teachings of the invention. By way of example, it will be observed that the present invention is readily configured for a combination of electrical and pneumatic control whereby all hydraulic components described herein are replaced by functionally equivalent pneumatic components. In this respect it will be observed that the manifold of the present invention, which comprises a solid block of material into which a plurality of suitably dimensioned cavities are formed, is readily adapted for use as an analogous pneumatic device into which pneumatic components may be substituted for the hydraulic components described herein. Consequently, it will be understood that the scope of the present invention is not, as a result of the specific teaching herein, limited to the combination of hydraulic and electrical control. The invention also comprehends other forms of control power including a combination of pneumatic and electrical control. Furthermore, it will be understood that other modifications and additions may be made to the present invention without deviating from the scope of protection which is to be limited only by the claims appended hereto.

I claim:

1. An improved remotely controllable actuator control system primarily for use with a plug-type valve and an operator for changing the flow configuration of the valve in response to a source of motive power, the actuator of the type having a source of motive power, means for activating the motive power source in response to a remotely initiated command for changing the flow configuration of the valve, means for sensing the actual flow configuration of the valve and means for deactivating the motive power source when the actual flow configuration of the valve has been changed in accordance with the remotely initiated command; the improvement comprising:

a manifold connected to said motive power source for selectively initiating motion in said source in either of two directions, said manifold having means responsive to said command for initiating motion in said source in a selected one of said two directions, said manifold also having means responsive to said flow configuration of said valve for stopping said selected motion of said source when said flow configuration has changed in accordance with said command;

said flow configuration responsive means comprising at least two independent switching devices;

said command responsive means comprising at least two independent power source control devices;

respective switching devices being connected to respective power source control devices to form at least two switching device-control device pairs, each such pair being operative to sequentially initiate and terminate an opposite change in valve flow configuration;

said source of motive power comprising a hydraulic pressure operated device having a rotatable shaft;

said power source control devices comprising solenoid operated hydraulic valves, one such valve connected to a clockwise input hydraulic pressure line of said hydraulic pressure operated device and one such valve connected to a counterclockwise input hydraulic pressure line of said hydraulic pressure operated device;

said switching devices comprising electrical switches, each such switch connected to one of said solenoid operated hydraulic valves for closing said hydraulic valves respectively, upon actuation of a switch, for blocking hydraulic pressure to said hydraulic pressure operated device;

said remotely initiated command comprising an electrical energy transmitted to each said electrical switch for opening said hydraulic valves respectively, for passing hydraulic pressure to said hydraulic pressure operated device;

said flow configuration responsive means further comprising a mechanical feedback member connected to said plug-type valve for emulating the configuration of the plug of said plug-type valve, and at least two switch paddles, each such paddle being attached to said feedback member and positioned relative to one of said switches, respectively, for actuating said one switch when said plug is configured for a first flow status through said plug-type valve and for actuating the other of said switches when said plug is configured for a second flow status through said plug-type valve;

said solenoid operated hydraulic valves, said switches, said switch paddles and all interconnecting wiring being contained within a unitary explosion-proof container;

said switches being mounted to a unitary bracket also contained within said container;

said manifold further comprising means for receiving a source of hydraulic fluid pressure and a replaceable filter element disposed within the path of said hydraulic fluid pressure within said manifold;

two manually operable hydraulic valves, each such manually operable valve being connected in parallel with a respective one of said solenoid operated hydraulic valves whereby the flow configuration of said plug-type valve may be changed by manually enabling hydraulic pressure to said hydraulic pressure operated device;

a first flow control valve connected to said manifold in series with said source of hydraulic fluid pressure for limiting the hydraulic flow applied to said hydraulic pressure operated device;

a second flow control valve connected to said manifold in parallel with said flow control valve and in series with an additional solenoid operated hydraulic valve for selectively limiting the hydraulic flow applied to said hydraulic pressure operated device to any of at least two levels; and an additional electrical switch connected to said additional solenoid operated hydraulic valve, and an additional switch paddle being attached to said feedback member and positioned relative to said additional switch for automatically changing the level of the hydraulic flow applied to said hydraulic pressure operated device during a change in the flow configuration of said plug-type valve.

2. An improved remotely controllable actuator control system primarily for use with a plug-type valve and an operator for opening and closing the valve in response to a rotating motor shaft, the actuator of the type having a motor, means for controlling the speed, direction and torque of the motor in response to a remote means initiating a command for opening or closing the valve, means for sensing the valve position, and means for stopping the motor when the valve has been positioned in accordance with the remotely initiated command; the improvement comprising:

a manifold connected to said motor for selectively initiating rotary motion of said motor shaft in either clockwise or counterclockwise directions, said manifold having means responsive to said command for initiating shaft rotation in a selected one of said two directions, said manifold also having means responsive to said sensing means for stopping said selected rotation of said motor when said valve has been positioned in accordance with said command;

said sensing responsive means comprising at least two independent switching devices;

said command responsive means comprising at least two independent motor control devices;

respective switching devices being connected to respective motor control devices to form at least two switching device-control device pairs, each such pair being respectively operative to sequencially initiate and terminate opening or closing of said valve;

said motor comprising a hydraulic motor, said switching devices comprising electrical switches, and said motor control devices comprising solenoid operated hydraulic valves, and each of said switches connected to a respective one of said solenoid valves for closing said solenoid valves upon actuation of a switch, for blocking hydraulic pressure to said hydraulic motor;

said remotely initiated command comprising electrical energy transmitted to each said electrical switch for opening said solenoid valves respectively, for passing hydraulic pressure to said hydraulic motor;

said sensing means comprising a mechanical feedback member connected to said plug-type valve for emulating the configuration of the plug of said plug-type valve, and at least two switch paddles, each such paddle being attached to said feedback member and positioned relative to one of said switches, respectively, for actuating one of said switches when said plug-type valve is open and for actuating the other of said switches when said plug-type valve is closed;

said solenoid valves, said switches, said switch paddles and all interconnecting wiring being contained within a unitary explosion-proof container of which said manifold forms a base;

said switches being mounted to a unitary bracket also contained within said container;

said manifold further comprising means for receiving a source of hydraulic fluid pressure and a replaceable filter element disposed within the path of said hydraulic fluid pressure within said manifold;

a first flow control valve connected to said manifold in series with said source of hydraulic fluid pressure for limiting the hydraulic flow applied to said hydraulic motor;

a second flow control valve connected to said manifold in parallel with said first flow control valve and in series with an additional solenoid valve for selectively limiting the hydraulic flow applied to said hydraulic motor to any of at least two levels; and an additional electrical switch connected to said additional solenoid valve, and an additional switch paddle being attached to said feedback member and positioned relative to said additional switch for automatically changing the level of the hydraulic flow applied to said hydraulic motor during opening and closing of said plug-type valve.

3. The improved valve actuator control system of claim 2 further comprising:

at least two check valves, said check valves connected hydraulically in series with and on opposite sides of said hydraulic motor for permitting hydraulic flow toward said motor and for preventing hydraulic flow toward said source whereby said motor is hydraulically decelerated upon removal of hydraulic pressure.

4. An improved electrically controllable hydraulic actuator control system primarily for use with a plug-type valve and an operator for opening and closing the valve in response to the rotating shaft of a hydraulic motor, the actuator of the type having a hydraulic motor, a source of pressurized hydraulic fluid, means for selectively applying hydraulic fluid pressure to the motor for opening or closing the valve, means for sensing whether the valve is opened or closed, and means for stopping the motor by removing the hydraulic fluid pressure when the valve has been opened or closed in accordance with an electrical control signal; the improvement comprising:

a hydraulic manifold connected to said hydraulic motor for selectively initiating rotation of said motor shaft in either clockwise or counter-clockwise directions, said manifold having hydraulic means responsive to said control signal for initiating shaft rotation in a selected one of said two directions, said manifold also having electrical means responsive to said sensing means for stopping said selected rotation of said motor when said valve has been opened or closed in accordance with said control signal;

said sensing responsive electrical means comprising at least two independent switching devices;

said control signal responsive hydraulic means comprising at least two solenoid operated hydraulic valves;

respective switching devices being connected to respective solenoid operated hydraulic valves to form at least two switch-valve pairs, each such pair being respectively operative to sequentially initiate and terminate opening or closing of said plug-type valve;

said sensing means comprising a mechanical feedback member connected to said plug-type valve for emulating the configuration of the plug of said plug-type valve, and at least two switch paddles, each such paddle being attached to said feedback member and positioned relative to one of said switches, respectively, for actuating one of said switches when said plug-type valve is open and for actuating the other of said switches when said plug-type valve is closed;

said solenoid valves, said switches, said switch paddles and all interconnecting wiring being contained within a unitary explosion-proof container;

said switches being mounted to a unitary bracket also contained within said container;

said manifold further comprising means for receiving a source of hydraulic fluid pressure and a replaceable filter element disposed within the path of said hydraulic fluid pressure within said manifold;

a first flow control valve connected to said manifold in series with said source of hydraulic fluid pressure for limiting the hydraulic flow applied to said hydraulic motor;

a second flow control valve connected to said manifold in parallel with said first flow control valve and in series with an additional solenoid valve for selectively limiting the hydraulic flow applied to said hydraulic motor to any of at least two levels; and an additional electrical switch connected to said additional solenoid valve, and an additional switch paddle being attached to said feedback member and positioned relative to said additional switch for automatically changing the level of the hydraulic flow applied to said hydraulic motor during opening and closing of said plug-type valve.

5. The improved valve actuator of claim 4 further comprising a plurality of indicator devices, each such indicator device connected to a terminal of one of said electrical switches, respectively, for indicating whether said plug-type valve is open, closed or in at least one intermediate flow configuration between open and closed.

* * * * *